(12) United States Patent
Tueysuez et al.

(10) Patent No.: US 12,074,004 B2
(45) Date of Patent: Aug. 27, 2024

(54) SELF-POWERED RECLOSER

(71) Applicant: ABB Schweiz AG, Baden (CH)

(72) Inventors: Arda Tueysuez, Darmstadt (DE); Christoph Budde, Heidelberg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/299,436

(22) Filed: Apr. 12, 2023

(65) Prior Publication Data

US 2023/0326700 A1   Oct. 12, 2023

(30) Foreign Application Priority Data

Apr. 12, 2022   (EP) .................................... 22167854

(51) Int. Cl.
*H01H 71/52* (2006.01)
*H01H 71/68* (2006.01)
*H02H 7/22* (2006.01)

(52) U.S. Cl.
CPC .......... *H01H 71/529* (2013.01); *H01H 71/68* (2013.01); *H02H 7/226* (2013.01)

(58) Field of Classification Search
CPC ........... H01H 2071/506; H01H 71/505; H01H 71/529; H01H 71/68; H01H 33/027; H01H 33/666; H01H 33/668; H01H 33/36; H01H 33/6662
See application file for complete search history.

(56) References Cited

U.S. PATENT DOCUMENTS

| | | | | |
|---|---|---|---|---|
| 5,584,383 A | * | 12/1996 | Matsuo | H01H 3/3042 |
| | | | | 200/402 |
| 2016/0026201 A1 | * | 1/2016 | Vellanki | G05F 1/66 |
| | | | | 700/297 |
| 2022/0108855 A1 | * | 4/2022 | Montenegro | H01H 33/666 |

FOREIGN PATENT DOCUMENTS

| | | |
|---|---|---|
| CN | 113517151 A | 10/2021 |
| KR | 10-2147403 B1 | 8/2020 |

OTHER PUBLICATIONS

Wu et al., "A novel kinetic energy harvester using vibration rectification mechanism for self-powered applications in railway," *Energy Conversion and Management*, 228, 12 pp. (Jan. 15, 2021).
European Patent Office, Extended European Search Report in European Patent Application No. 22167854.3, 5 pp. (Sep. 16, 2022).

* cited by examiner

*Primary Examiner* — Bryan R Perez
(74) *Attorney, Agent, or Firm* — Leydig, Voit & Mayer, Ltd.

(57) ABSTRACT

A self-powered recloser includes a circuit breaker, an electrical actuator, an electrical generator, a capacitor, and a lever. When in an on state, the circuit breaker harvests power from a medium voltage line required to actuate its movable contact to interrupt current flow in the medium voltage line, and when in an off state, it does not harvest power from the medium voltage line. The electrical actuator is configured to transition the circuit breaker from the off state to the on state. The capacitor when charged is configured to provide the electrical actuator with the electrical power required to transition the circuit breaker from the off state to the on state. The lever is configured to be moved by an operative. Movement of the lever is configured to charge the capacitor via the electrical generator.

20 Claims, 6 Drawing Sheets

SELF-POWERED RECLOSER

CROSS-REFERENCE TO RELATED APPLICATIONS

This patent application claims priority to European Patent Application No. 22167854.3, filed on Apr. 12, 2023, which is incorporated herein in its entirety by reference.

FIELD OF THE DISCLOSURE

The present disclosure generally relates to circuit breakers and, more specifically, to reclosers.

BACKGROUND OF THE INVENTION

Reclosers are circuit breakers typically rated between 15-40 kV, designed for use on overhead electricity distribution networks to detect and interrupt momentary faults. The interruption typically takes place in a vacuum interrupter. Actuation (moving the relevant parts of the recloser to turn it on and off) is typically provided by an electromagnetic actuator. Generally, the electromagnetic actuator is directly connected to the pushrod of the vacuum interrupter (as opposed to having a linkage with a transmission ratio other than unity). In many practical arrangements, the electromagnetic actuator contains a permanent magnet, which keeps the recloser in its on state, even when no electrical power is applied to the electromagnetic actuator. However, electrical power must be applied to the electromagnetic actuator to switch between the on and off states of the recloser. The electrical power applied to the actuator to turn the recloser on or off is henceforth called auxiliary power to avoid confusion with the main power in the main 15-40 kV circuit, which the recloser may switch on or off via its circuit breaking functionality.

The auxiliary power may be provided to the recloser by means of cable connections. Alternatively, the recloser may be designed to be self-powered, in which, auxiliary power may be harvested from the main electrical circuit e.g., via a transformer. However, this means that when a recloser is inserted in a circuit for a first time, and it was in off state, there can be no current flowing in the main circuit and the recloser cannot harvest any auxiliary power. Alternatively, the recloser may be inserted in the main circuit while it is in on state; however, this is a dangerous operation as it means powering a section of a medium-voltage line by manually inserting a conductor in the circuit. It may cause injuries as well as equipment damage.

Therefore, a self-powered recloser is a medium-voltage circuit breaker that harvests the auxiliary power that is needed to actuate the recloser from a medium-voltage line e.g., via a transformer. The initial commissioning of a self-powered recloser is however challenging. If the recloser is inserted into the medium-voltage line in its on state, the operator inserting the recloser into the circuit would be energizing sections of a medium-voltage network in an uncontrolled fashion, which may cause damage to equipment and/or injury of personnel. On the other hand, if the recloser is inserted in the circuit in its off state, there is no current flowing in the medium-voltage line and no auxiliary power can be harvested.

A state-of-the-art recloser (see FIG. 1) may solve this problem by introducing a spring-driven, mechanical actuator in addition to the electromagnetic actuator. The recloser is inserted in the main circuit in its off state. Then, the operator uses a long, insulated rod to turn a handle that is mounted on the housing of the recloser (see FIG. 2d). Through a mechanical mechanism, the first rotation of the handle charges a set of springs and latches them. The second time the operator turns the handle, the same mechanism discharges the springs and initiates a closing (turning on, making) motion with defined speed. From that point on auxiliary power may be harvested and the electromagnetic actuator can be used to turn the recloser on or off. The problem with this approach is that a mechanical mechanism is needed, which is used only during the initial commissioning. The mechanical mechanism drives the costs higher. Moreover, manufacturing and assembly tolerances, temperature variations, changing friction within the lifetime of the mechanical mechanism could lead to a reduction in the reliability of the system. In FIG. 1 and FIGS. 2a-2d, reference numeral 20 indicates the circuit breaker and reference numeral 30 indicates the electrical actuator within the housing, and the spring-driven, mechanical actuator, which is also within the housing. In FIGS. 1 and 2a-2d, reference numeral 50 indicates a lever or handle, or crank—a lever for example that can perform full rotations.

Another approach to provide the initial auxiliary power is to use a small electrical energy storage system (e.g., batteries or capacitors), which can be charged before inserting the recloser in the medium-voltage line. However, this not only increases the cost, but also the effort of commissioning (the operator needs to make sure that the energy storage is charged and may potentially need to carry a charger etc.).

Another approach includes harvesting power from the line voltage instead of the line current, such that auxiliary power can be harvested even when the recloser is in its off state. However, this requires that challenging insulation requirements are met.

BRIEF SUMMARY OF THE INVENTION

The present disclosure describes an improved self-powered recloser. In a first aspect, there is provided self-powered recloser, comprising:
  a circuit breaker;
  an electrical actuator;
  an electrical generator;
  a capacitor; and
  a lever.

The circuit breaker when in an on state is configured to harvest power from a medium voltage line required to actuate its movable contact to interrupt current flow in the medium voltage line. The circuit breaker when in an off state is configured not to harvest power from the medium voltage line required to actuate its movable contact to interrupt current flow in the medium voltage line. The electrical actuator is configured to transition the circuit breaker from the off state to the on state. The capacitor when charged is configured to provide the electrical actuator with the electrical power required to transition the circuit breaker from the off state to the on state. The lever is configured to be moved by an operative. Movement of the lever is configured to charge the capacitor via the electrical generator.

BRIEF DESCRIPTION OF THE SEVERAL VIEWS OF THE DRAWING(S)

DETAILED DESCRIPTION OF THE INVENTION

Figure 1:
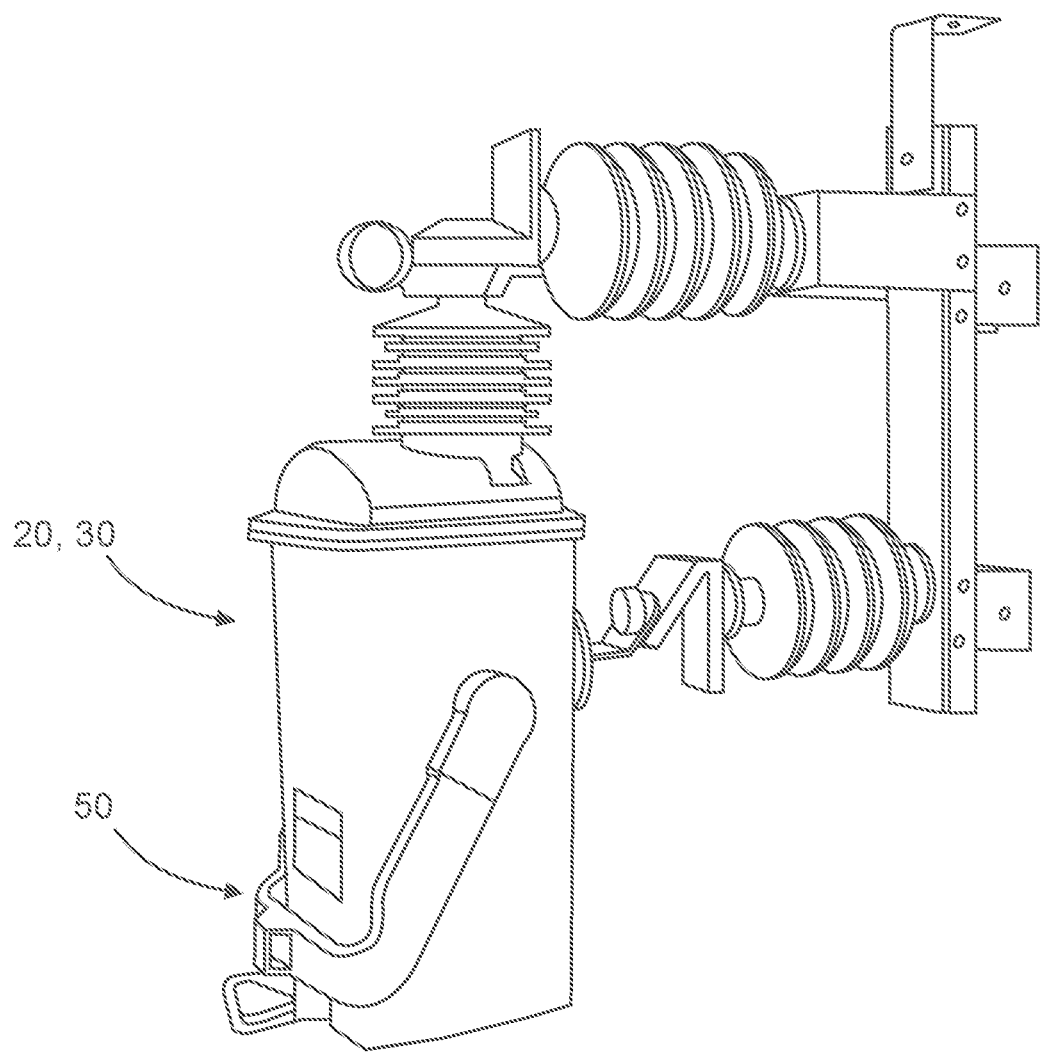
FIG. 1 is an outline view of a state-of-the-art self-powered recloser.
Figure 2:
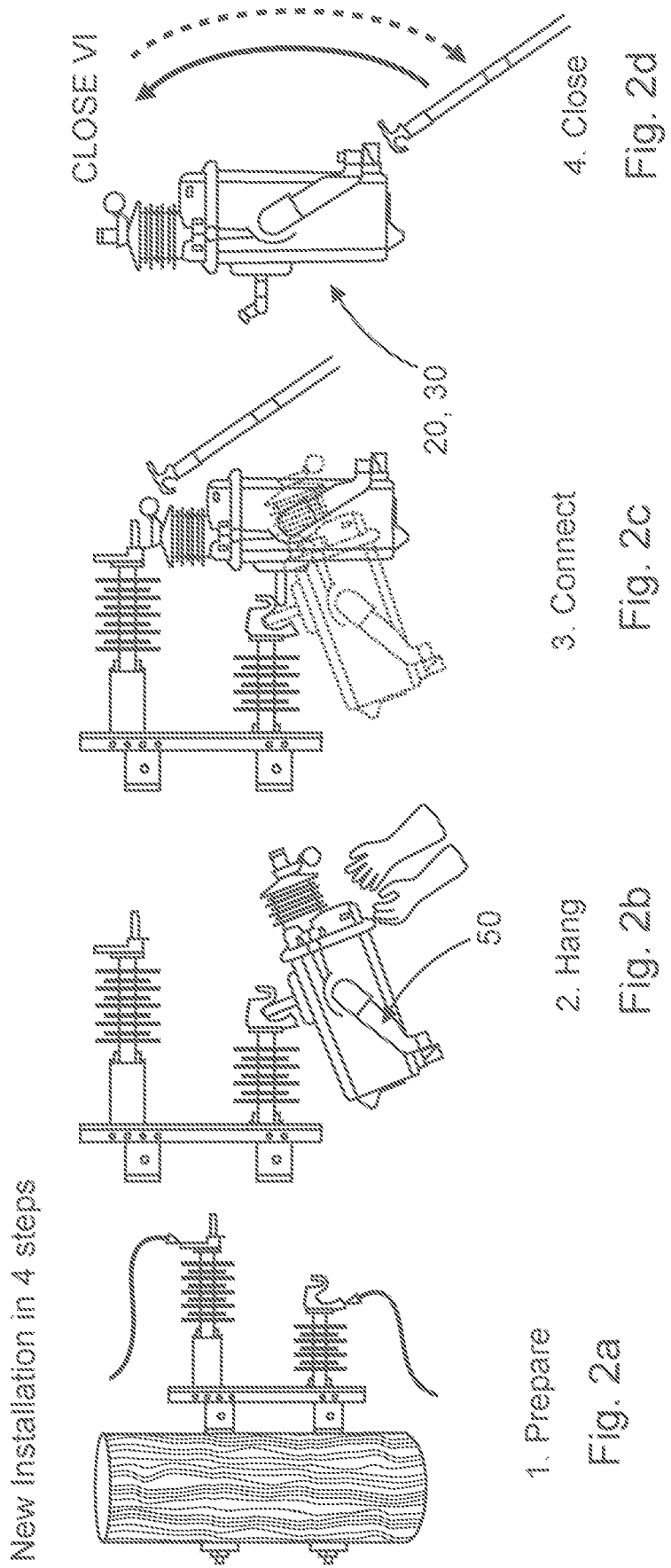
FIGS. 2a-2d show schematic representations of installation steps for the self-powered recloser of FIG. 1, where once mounted on the overhead line, an insulated rod can be used by the operator or operative to turn the lever or handle on the housing.

FIGS. 3, 4a-4d, 5, and 6 relate to a new self-powered recloser 10. The self-powered recloser 10 comprises a circuit breaker 20, an electrical actuator 30, an electrical generator 40, a capacitor 60, and a lever 50. The circuit breaker when in an on state is configured to harvest power from a medium voltage line required to actuate its movable contact to interrupt current flow in the medium voltage line. The circuit breaker when in an off state is configured not to harvest power from the medium voltage line required to actuate its movable contact to interrupt current flow in the medium voltage line. The electrical actuator is configured to transition the circuit breaker from the off state to the on state. The capacitor when charged is configured to provide the electrical actuator with the electrical power required to transition the circuit breaker from the off state to the on state. The lever is configured to be moved by an operative. Movement of the lever is configured to charge the capacitor via the electrical generator.

According to an example, a linear movement of the lever is configured to rotate a shaft of the electrical generator to charge the capacitor via the electrical generator. According to an example, a rotational movement of the lever is configured to rotate the shaft of the electrical generator to charge the capacitor via the electrical generator. In an example, a linear movement of the lever is configured to linearly move the shaft of the electrical generator to charge the capacitor via the electrical generator. In an example, a rotational movement of the lever is configured to linearly move the shaft of the electrical generator to charge the capacitor via the electrical generator.

According to an example, the recloser comprises a conditioning circuit 70. The rotation of the shaft of the electrical generator is configured to induce an AC voltage in the electrical generator. The conditioning circuit is configured to convert the AC voltage to a DC voltage to charge the capacitor via the electrical generator. In an example, the recloser comprises a conditioning circuit 70. The linear movement of the shaft of the electrical generator is configured to induce an AC voltage in the electrical generator. The conditioning circuit is configured to convert the AC voltage to a DC voltage to charge the capacitor of the electrical generator. Thus, the mechanical power provided by the operative is transferred via the lever (and transmission) to the generator, where it is converted into electrical power. This electrical power (can then be conditioned in 70 and) is stored in the capacitor(s).

According to an example, the conditioning circuit comprises a half-wave rectification circuit, and in another example the conditioning circuit comprises a full-wave rectification circuit. According to an example, the conditioning circuit comprises a transformer and/or voltage multiplying rectification circuit and/or a boost converter circuit.

According to an example, the rotation of the shaft in both directions is configured to charge the capacitor via the electrical generator. According to an example, the lever is connected to the electrical generator via a unidirectional connection. The unidirectional connection is configured such that power is only transmitted, when moving the lever in one direction. In an example, the generator comprises a linearly moving shaft. To revert the shaft to its original position a reset spring is utilized. Thus, for example a one-way bearing is utilized where only one direction of the lever's movement is coupled to the generator's shaft. In other words, a unidirectional mechanical connection can be made between the lever and generator's shaft.

According to an example, the recloser comprises a spring configured to bring the lever back to a start position following movement of the lever away from the start position.

According to an example, the shaft comprises a flywheel.

According to an example, the rotation of the shaft of the electrical generator is configured to induce a DC voltage in the electrical generator.

According to an example, the conditioning circuit comprises a single diode connected in series.

According to an example, the conditioning circuit comprises a full wave rectification circuit.

According to an example, the electrical generator comprises a transmission 80 between the lever and the shaft. The transmission is configured such that a rotation of the lever by a first angle leads to a rotation of the shaft by a second angle greater than the first angle.

According to an example, the recloser comprises wireless control electronics 90 configured to control the electrical actuator to transition the circuit breaker from the off state to the on state. The charged capacitor is configured to provide the control electronics with the required power to control the electrical actuator.

According to an example, the recloser comprises at least one sensor configured to detect a position of the lever. The electrical actuator is configured to transition the circuit breaker from the off state to the on state when the lever is detected to be away from a rest position and the capacitor has enough stored energy to provide the electrical actuator with the electrical power required to transition the circuit breaker from the off state to the on state.

Figure 3:
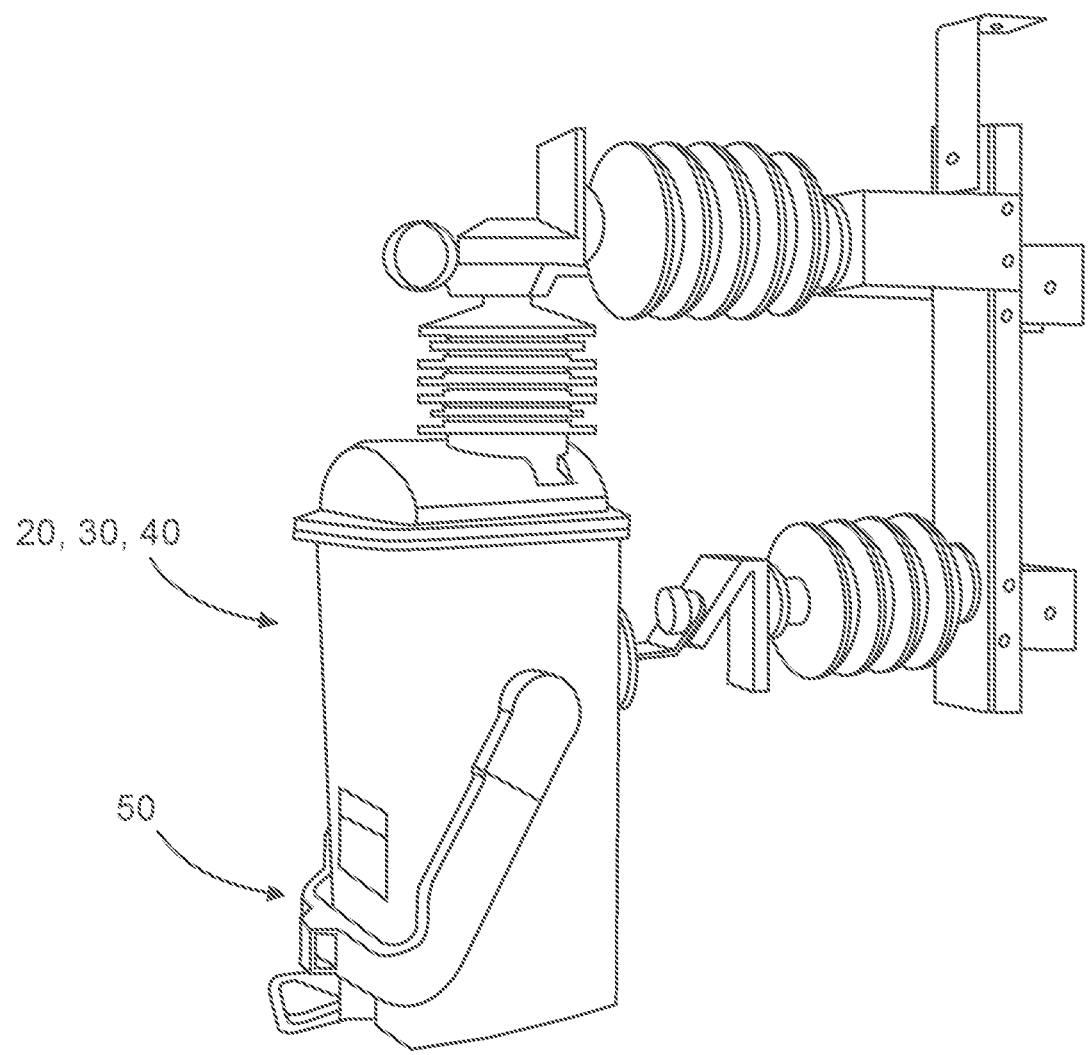
FIG. 3 is an outline view of a new self-powered recloser in accordance with the disclosure.
Figure 4:
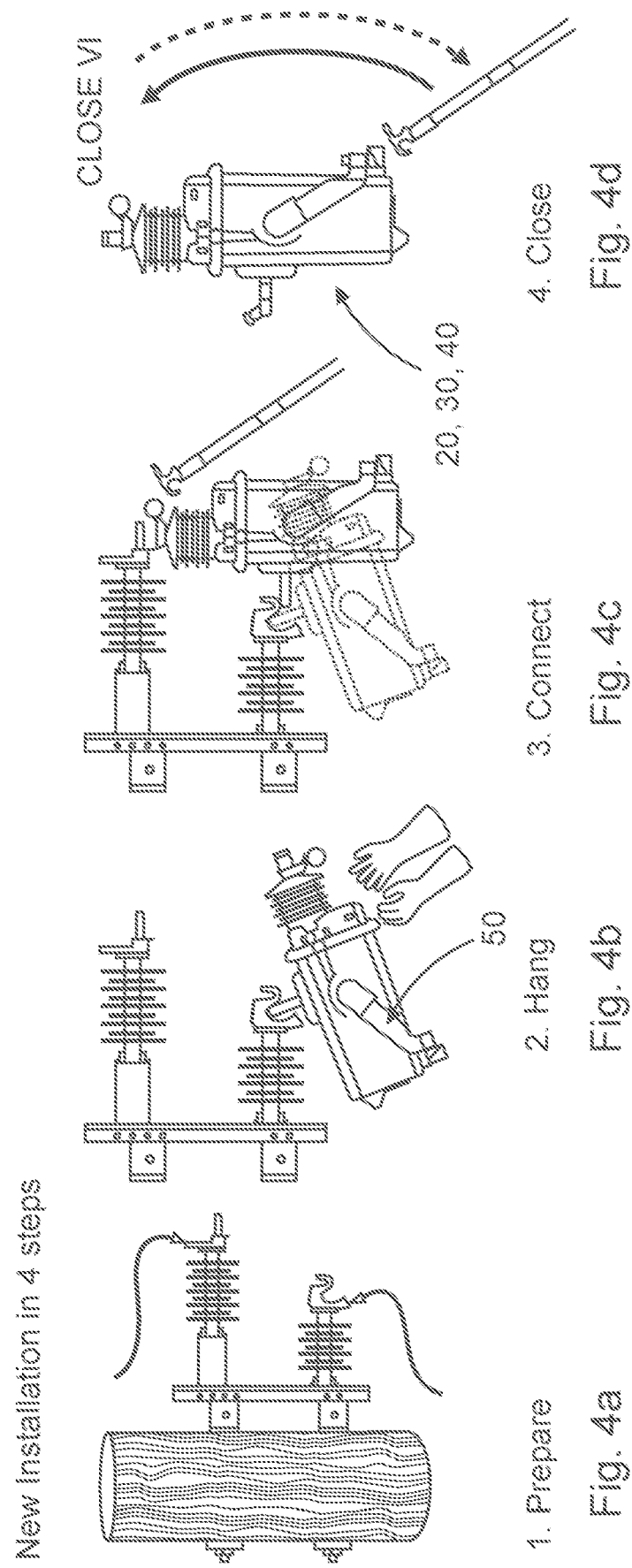
FIGS. 4a-4d are schematic representations of the installation steps for the self-powered recloser of FIG. 3, where once mounted on the overhead line, an insulated rod can be used by the operator or operative to turn the lever or handle on the housing.

The new self-powered recloser 10 is now described in specific detail, where again reference is made to FIGS. 3-6. FIG. 3 shows the new self-powered recloser 10 and FIGS. 4a-4d show the installation steps of the new self-powered recloser. In FIGS. 3 and 4a-4d, reference numeral 20 indicates the circuit breaker and reference numeral 30 indicates the electrical actuator within the housing, reference numeral 40 indicates the electrical generator that is also within the housing, and reference numeral 50 indicates a lever or handle.

As seen by the operator, the commissioning of the new self-powered recloser is largely the same as that for state-of-the-art reclosers. However, now the handle is connected to a small electrical generator. When the handle is rotated, the generator converts this motion into electrical power. This electrical power charges a DC link capacitor, which is part of the electromagnetic actuator's drive circuit. When the capacitor is charged up to an adequate voltage level, the electromagnetic actuator can turn the recloser on, in effect putting the circuit breaker into an on state where it can now interrupt current and having interrupted current close its contacts again to revert to a non-interrupting state.

Thus, in the new self-powered recloser, a small generator is introduced, whose shaft is connected to the handle on the housing via a simple mechanism, such that rotating the lever will rotate the shaft of the generator (the shaft of the generator can also linearly move, and rotation or linear movement of the lever can rotate or linearly move the shaft). Generators with permanent magnets can be utilized, as they do not need any electrical power to operate and can directly induce a voltage upon the shaft being moved. The electrical power generated by the generator charges a DC capacitor, which is part of the electromagnetic actuator's drive circuit. Once there is enough energy stored in the capacitor, the drive circuit applies the stored energy to the actuator and initiates the turning on.

Figure 5:
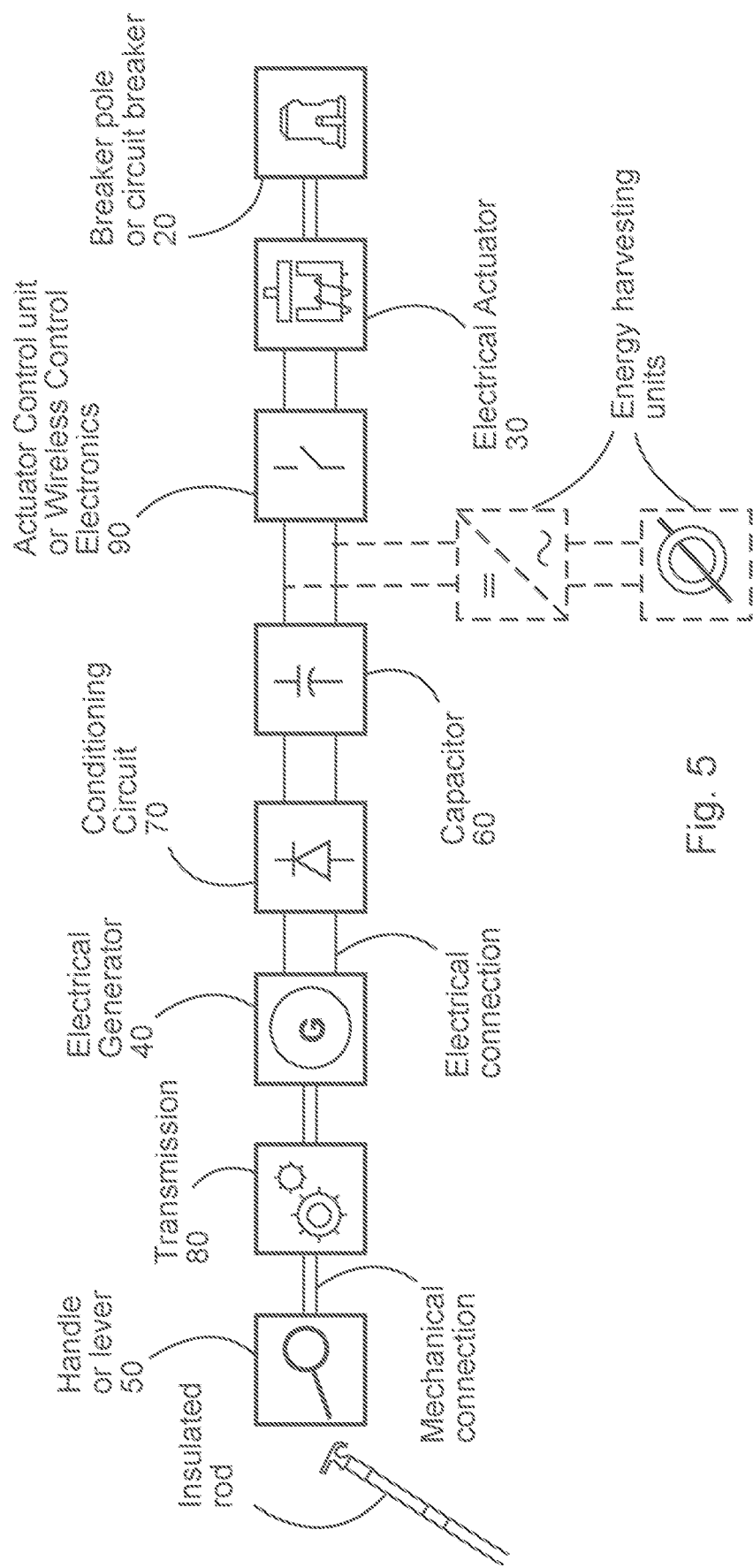
FIG. 5 is a schematic of an architecture of an example of a self-powered recloser in accordance with the disclosure.

FIG. 5 shows a simplified block diagram of the new self-powered recloser 10. In FIG. 5, the following are indicated by reference numerals:
- 20—Breaker Pole or Circuit Breaker
- 30—Electrical Actuator
- 40—Electrical Generator
- 50—Handle or Lever
- 60—Capacitor
- 70—Conditioning Circuit
- 80—Transmission
- 90—Actuator Control unit or Wireless Control Electronics Different implementations (embodiments) of the new self-powered recloser are described below. As it is made clear from those examples, not all the blocks shown in FIG. 5 are always needed, and some extra blocks, which are not shown in FIG. 5, can be implemented.

Both linear and rotary generators can be used, however, a rotational design can be simpler to implement, and all the examples described below refer to a rotary generator. Nevertheless, most of these examples can also be applied to a linear generator as would be appreciated by the skilled person.

One way of implementing the generator is to mount one or more permanent magnets on the outer radial face of a rotary shaft, that is actuated by the handle. The permanent magnet(s) can cover the whole or only a section of the shaft in the circumferential direction. In case a plurality of permanent magnets is used, they are arranged with alternating polarities (North—N or South—S) in the circumferential direction. For completeness the alternating poles can be for example NSNSNS . . . but can be for example NNSSNNSS . . . or NNNSSNS . . . , in other words the generator will work as long as there are somewhere alternating poles. One or more coils, preferably made of insulated copper wire, are arranged radially outside the permanent magnets with a small (0.1 mm to 1 mm) air gap. This can be altered outside of this range if necessary. The coil(s) are preferably wound on a ferromagnetic core, which is preferably made of insulated sheets stacked in the axial direction. The coil(s) may cover the whole or a section of the shaft's circumference.

In this arrangement, when the handle turns the shaft, the permanent magnet(s), which are fixedly mounted on the shaft, also rotate, and the magnetic flux(es) linked by the coil(s) change(s) with time. This results in an induced voltage in the coils. The induced voltage is of AC type and is converted to DC (rectified) to charge the capacitor. This is done by the conditioning circuit shown in FIG. 5. One method is to connect a single diode in series with each coil (half-wave rectification). Alternatively, four diodes per coil can be used as in the well-known full-wave rectifier circuit. If the coils are, for example, arranged to form three phases in star or delta connection, a total of six diodes are sufficient for rectification.

Another way of implementing the generator is to fixedly mount a ferromagnetic core whose magnetic reluctance in the radial direction varies in the circumferential direction on the shaft. In other words, the alternating magnetic poles of the permanent magnets described above are replaced by a varying reluctance of the ferromagnetic core mounted on the shaft. In this arrangement, one or more permanent magnets are fixedly mounted radially outside, together with one or more coils. The coil(s) are preferably wound on a ferromagnetic core, which is preferably made of insulated sheets stacked in the axial direction. The ferromagnetic core mounted on the shaft may also be made of insulated sheets stacked in the axial direction. In this arrangement, when the handle turns the shaft and the ferromagnetic core mounted on it, the magnetic flux linked by the coils changes with time. This results in an induced voltage in the coils. The induced voltage is of AC type and is converted to DC (rectified) to charge the capacitor. This is done by the conditioning circuit shown in FIG. 5. One method is to connect a single diode in series with each coil (half-wave rectification). Alternatively, four diodes per coil can be used as in the well-known full-wave rectifier circuit. If the coils are, for example, arranged to form three phases in star or delta connection, a total of six diodes are sufficient for rectification.

Figure 6:
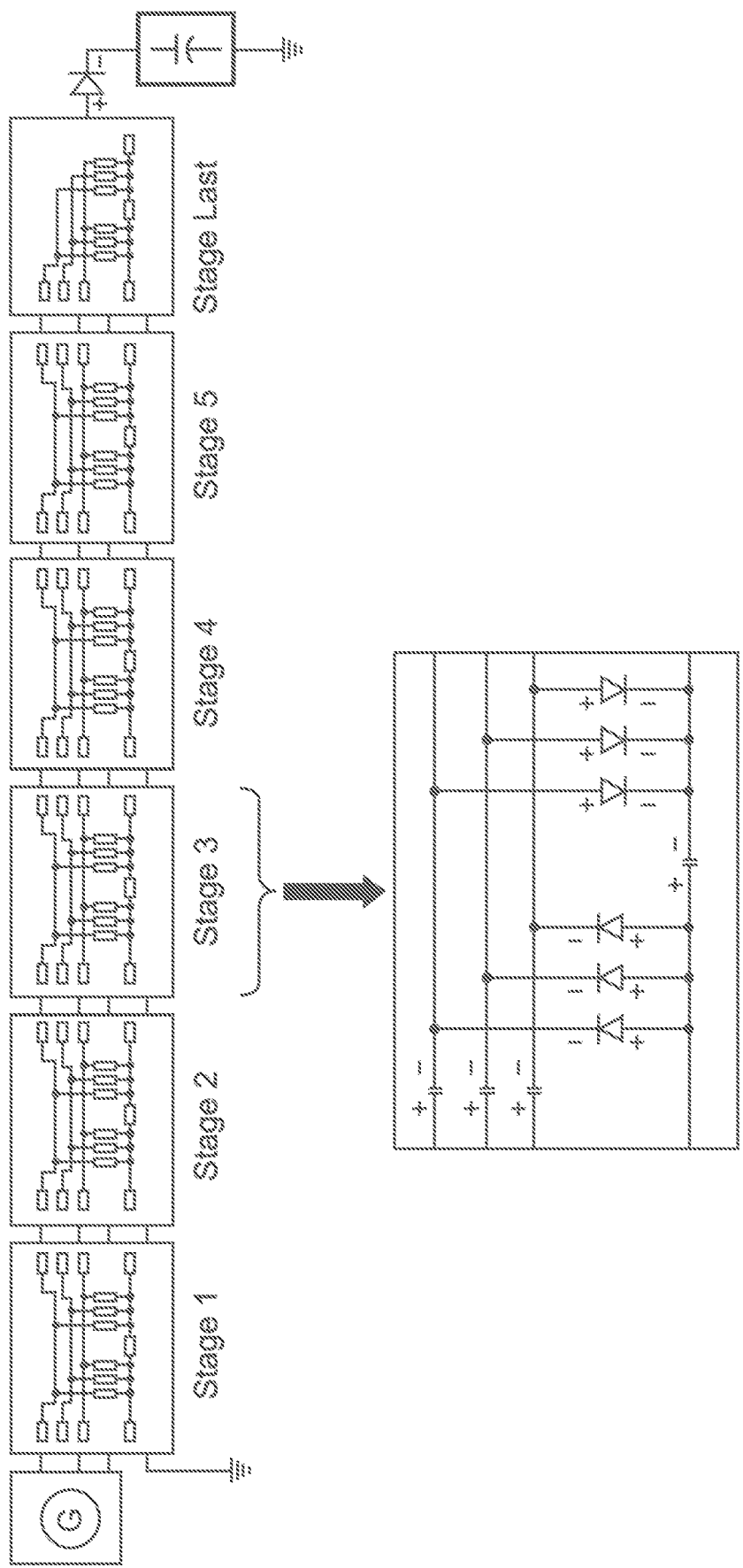
FIG. 6 is a schematic of a 6-stage voltage multiplying rectifier of an example of the self-powered recloser in accordance with the disclosure.

In such arrangements, both the frequency, and the amplitude of the induced voltage depend on the shaft speed. In an example the shaft is directly connected to the handle, and its speed is limited by the force that can be reasonably applied by the operator. In case the generator voltage is not enough to charge the capacitor to required voltage levels, the conditioning circuit can then also have a step-up functionality. This can be achieved by using transformer(s), and/or a voltage multiplying rectifier (which can for example be a three-phase voltage multiplying rectifier if a three-phase generator is being utilized). A six-stage example of such a circuit is shown in FIG. 6, which shows a 6-stage voltage multiplying rectifier.

Alternatively, an off-the-shelf AC electrical machine such as a brushless DC motor or a permanent magnet synchronous motor can be used as a generator. In this case, the shaft of the generator can be directly rotated by the handle. The same considerations apply to the conditioning circuit as discussed above.

The generators considered so far can be called AC generators, since they generate an AC voltage even if the shaft rotates continuously in the same direction. This means that the conditioning circuit must have a rectification function. Once there is a rectifier between the generator and the capacitor, the direction of the shaft becomes irrelevant. This is important in practice, because the handle may have a limited stroke, such as 90 mechanical degrees. With an AC generator and a conditioning circuit with rectification function, and if the handle is connected to the generator's shaft bidirectionally (force is transmitted regardless of the direction of motion), power will be generated both when the operator moves the handle upwards and downwards.

Alternatively, a unidirectional connection can be considered between the handle and the shaft, e.g., by using unidirectional (one-way) bearings. In this case, the operator's force is transmitted to the generator either during the upwards or the downwards motion of the handle. A spring can be used to bring the handle to its starting position to assist the resetting of the handle's position. A flywheel can be added on the shaft in this case, to provide a continuous motion to the generator's shaft, and a continuous power generation to charge the capacitor.

To increase the speed of the generator's shaft, a gearbox or other mechanical transmission type (e.g., belt, chain) can be added between the handle and the generator's shaft. The transmission ratio is preferably fixed, and between for example 1:50 and 1:300. Different transmission ratios can be utilized.

As an alternative to the AC generators mentioned so far, a DC generator can also be implemented by using a permanent magnet brushed DC motor. In such electrical machines, the induced voltage is DC with an amplitude proportional to the speed. Therefore, the shaft speed must be enough to generate the voltage levels needed to charge the capacitor. Alternatively, the conditioning circuit can again have a step-up functionality, but stepping up DC voltage requires a more complex solution, such as a boost converter circuit. This step-up functionality can be utilized but may not be the first choice embodiment due to its complexity. A mechanical gear can also be used to increase the generator's shaft speed and therefore the voltage output, as described above.

A DC generator can then utilize a single diode connected in series, to avoid discharging the capacitor when the generator is no longer moving. Alternatively, a four-diode, full-wave rectifier can be used, allowing the generator to charge the capacitor regardless of the direction of motion.

The new self-powered recloser can have wireless connection functionality, which allows a wireless commanding of turning on and off operations.

The new self-powered recloser can be arranged such that once the capacitor has enough energy, the control electronics are ready to accept such a wireless command. In other words, all the operator-commanded switching actions, including the initial turning on, can be commanded wirelessly.

Alternatively, the new self-powered recloser can be arranged with position sensors such as micro switches to detect the position of moving parts such as the handle (or even accelerometers the output of which is integrated). The drive electronics can be arranged such that if the handle is detected to be away from its resting position, and the capacitor has enough energy stored, a switching operation is initiated.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

The above-described circuit breaker refers to for example the breaker pole. The capacitor can be a single capacitor or can be one or more capacitors—such as a capacitor bank. In an example, a linear movement of the lever is configured to rotate a shaft of the electrical generator to charge the capacitor via the electrical generator. Thus, the mechanical power provided by the operative is transferred via the lever (and transmission) to the generator, where it is converted into electrical power. This electrical power (is then conditioned in 70 and) is stored in the capacitor(s).

In an example, a rotational movement of the lever is configured to rotate the shaft of the electrical generator to charge the capacitor via the electrical generator.

In an example, the recloser comprises a conditioning circuit. The rotation of the shaft of the electrical generator is configured to induce an AC voltage in the electrical generator. The conditioning circuit is configured to convert the AC voltage to a DC voltage to charge the capacitor via the electrical generator.

In an example, the conditioning circuit comprises a half-wave rectification circuit. In an example, the conditioning circuit comprises a full-wave rectification circuit. In an example, the conditioning circuit comprises a transformer and/or voltage multiplying rectification circuit and/or a boost converter circuit. There can be more than one transformer.

In an example, rotation of the shaft in both directions is configured to charge the capacitor via the electrical generator. In an example, the lever is connected to the electrical generator via a unidirectional connection. The unidirectional connection is configured such that power is only transmitted, when moving the lever in one direction. Thus, the unidirectional connection allows to retract the lever to its original position without rotating the generator shaft.

In an example, the recloser comprises a spring configured to bring the lever back to a start position following movement of the lever away from the start position. In an example, the shaft comprises a flywheel. The flywheel can be utilized for example to keep a shaft rotating through the increase in angular momentum and finds particular utility in a unidirectional connection for a shaft. However, a flywheel can be utilized for a shaft that rotates in both directions.

In an example, the rotation of the shaft of the electrical generator is configured to induce a DC voltage in the electrical generator. In an example, the conditioning circuit comprises a single diode connected in series. In an example, the conditioning circuit comprises a full wave rectification circuit.

In an example, the recloser comprises a transmission between the lever and the generator shaft. The transmission is configured such that a rotation of the lever by a first angle leads to a rotation of the shaft by a second angle greater than the first angle. Thus, a small rotation of the lever can lead to an increased rotation of the shaft. In an example, the electrical generator comprises a transmission between the lever and the shaft. The transmission is configured such that a rotation of the lever by a first angle leads to a rotation of the shaft by a second angle smaller than the first angle. Thus, for a shaft that can be difficult to rotate, mechanical advantage is provided where a large rotation of the lever leads to a small rotation of the shaft. In an example, an output of the transmission comprises a flywheel. Thus, the flywheel can be utilized to help maintain a rotational movement.

In an example, the recloser comprises wireless control electronics configured to control the electrical actuator to transition the circuit breaker from the off state to the on state. The charged capacitor is configured to provide the control electronics with the required power to control the electrical actuator. In an example, the recloser comprises at least one sensor configured to detect a position of the lever and the electrical actuator is configured to transition the circuit breaker from the off state to the on state when the lever is detected to be away from a rest position and the capacitor has enough stored energy to provide the electrical actuator with the electrical power required to transition the circuit breaker from the off state to the on state. The sensor can be a position sensor, or microswitch or even an accelerometer the output of which is in effect double integrated to provide distance information.

Thus, the new technique utilizes a small, low-cost electrical generator to provide an actuator, that can turn the recloser on such that it becomes self-powered, with the necessary power to turn the recloser on. The electrical generator is connected to a lever on the housing of the recloser, which can be actuated by an operator or operative either directly holding it (e.g., for testing purposes) or by the help of a long, insulated rod (e.g., when the recloser is inserted in the medium-voltage line). Thus, an operator or operative can safely insert the recloser into the circuit in its off state, and afterwards use the lever to rotate the generator, whose output power is used for the initial turning on of the recloser.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self-powered recloser, comprising:
   a circuit breaker;
   an electrical actuator;
   an electrical generator;
   a capacitor;
   a lever; and
   control electronics;
   wherein the circuit breaker when in an on state is configured to harvest power from a medium voltage line required to actuate its movable contact to interrupt current flow in the medium voltage line;
   wherein the circuit breaker when in an off state is electrically isolated and configured not to harvest power from the medium voltage line required to actuate its movable contact to interrupt current flow in the medium voltage line;
   wherein the electrical actuator is configured to transition the circuit breaker from the off state to the on state;
   wherein the capacitor when charged is configured to provide the electrical actuator with the electrical power required to transition the circuit breaker from the off state to the on state;
   wherein the lever is configured to be moved by an operative;
   wherein movement of the lever is configured to charge the capacitor via the electrical generator;
   wherein the control electronics are configured to control the electrical actuator to transition the circuit breaker from the off state to the on state; and
   wherein the charged capacitor is configured to provide the control electronics with the required power to control the electrical actuator.

2. The self-powered recloser according to claim 1, wherein a linear movement of the lever is configured to rotate a shaft of the electrical generator to charge the capacitor via the electrical generator.

3. The self-powered recloser according to claim 2, wherein the recloser comprises a conditioning circuit, wherein the rotation of the shaft of the electrical generator is configured to induce an AC voltage in the electrical generator, and wherein the conditioning circuit is configured to convert the AC voltage to a DC voltage to charge the capacitor via the electrical generator.

4. The self-powered recloser according to claim 3, wherein the conditioning circuit comprises a half-wave rectification circuit.

5. The self-powered recloser according to claim 3, wherein the conditioning circuit comprises a full-wave rectification circuit.

6. The self-powered recloser according to claim 3, wherein the conditioning circuit comprises a transformer and/or voltage multiplying rectification circuit and/or boost converter circuit.

7. The self-powered recloser according to claim 2, wherein the lever is connected to the electrical generator via a unidirectional connection, and wherein the unidirectional connection is configured such that power is only transmitted when moving the lever in one direction.

8. The self-powered recloser according to claim 7, wherein the recloser comprises a spring configured to bring the lever back to a start position following movement of the lever away from the start position.

9. The self-powered recloser according to claim 2, wherein the shaft comprises a flywheel.

10. The self-powered recloser according to claim 2, wherein the rotation of the shaft of the electrical generator is configured to induce a DC voltage in the electrical generator.

11. The self-powered recloser according to claim 10, wherein a conditioning circuit comprises a single diode connected in series; or wherein the conditioning circuit comprises a full wave rectification circuit.

12. The self-powered recloser according to claim 2, wherein rotation of the shaft in both directions is configured to charge the capacitor via the electrical generator.

13. The self-powered recloser according to claim 1, wherein a rotational movement of the lever is configured to rotate a shaft of the electrical generator to charge the capacitor via the electrical generator.

14. The self-powered recloser according to claim 13, wherein the electrical generator comprises a transmission between the lever and the shaft, wherein the transmission is configured such that a rotation of the lever by a first angle leads to a rotation of the shaft by a second angle greater than the first angle.

15. A self-powered recloser, comprising:
a circuit breaker;
an electrical actuator;
an electrical generator;
a capacitor;
a lever;
control electronics; and
at least one sensor;
wherein the circuit breaker when in an on state is configured to harvest power from a medium voltage line required to actuate its movable contact to interrupt current flow in the medium voltage line;
wherein the circuit breaker when in an off state is electrically isolated and configured not to harvest power from the medium voltage line required to actuate its movable contact to interrupt current flow in the medium voltage line;
wherein the electrical actuator is configured to transition the circuit breaker from the off state to the on state;
wherein the capacitor when charged is configured to provide the electrical actuator with the electrical power required to transition the circuit breaker from the off state to the on state;
wherein the lever is configured to be moved by an operative;
wherein movement of the lever is configured to charge the capacitor via the electrical generator;
wherein the control electronics are configured to control the electrical actuator to transition the circuit breaker from the off state to the on state; and
wherein the at least one sensor is configured to detect a position of the lever and the electrical actuator is configured to transition the circuit breaker from the off state to the on state when the lever is detected to be away from a rest position and the capacitor has enough stored energy to provide the electrical actuator with the electrical power required to transition the circuit breaker from the off state to the on state.

16. The self-powered recloser according to claim 15, wherein a rotational movement of the lever is configured to rotate a shaft of the electrical generator to charge the capacitor via the electrical generator.

17. The self-powered recloser according to claim 15, wherein a linear movement of the lever is configured to rotate a shaft of the electrical generator to charge the capacitor via the electrical generator.

18. The self-powered recloser according to claim 17, wherein the recloser comprises a conditioning circuit, wherein the rotation of the shaft of the electrical generator is configured to induce an AC voltage in the electrical generator, and wherein the conditioning circuit is configured to convert the AC voltage to a DC voltage to charge the capacitor via the electrical generator.

19. The self-powered recloser according to claim 18, wherein the conditioning circuit comprises a half-wave rectification circuit.

20. The self-powered recloser according to claim 18, wherein the conditioning circuit comprises a full-wave rectification circuit.

\* \* \* \* \*